(12) United States Patent
Johnson

(10) Patent No.: US 6,736,358 B2
(45) Date of Patent: May 18, 2004

(54) DEVICE FOR HOLDING CAMPING ITEMS

(76) Inventor: Freddie E. Johnson, 1163 Buccaneer Dr., Salt Lake City, UT (US) 84116

( * ) Notice: Subject to any disclaimer, the term of this patent is extended or adjusted under 35 U.S.C. 154(b) by 0 days.

(21) Appl. No.: 10/142,319

(22) Filed: May 9, 2002

(65) Prior Publication Data

US 2002/0166928 A1 Nov. 14, 2002

Related U.S. Application Data

(60) Provisional application No. 60/290,223, filed on May 11, 2001.

(51) Int. Cl.$^7$ .................................................. A47F 5/00
(52) U.S. Cl. ................................................... 248/125.3
(58) Field of Search ............................. 248/125.3, 156, 248/121, 227.2, 231.71, 165, 166, 167, 434

(56) References Cited

U.S. PATENT DOCUMENTS

| | | | | |
|---|---|---|---|---|
| 670,144 A | * | 3/1901 | Bond | 248/226 |
| 699,066 A | * | 4/1902 | Baskett | 248/124.1 |
| 758,015 A | * | 4/1904 | Miller | 248/125.3 |
| 1,002,260 A | * | 9/1911 | Golden | 246/477 |
| 1,366,872 A | * | 1/1921 | Cantleberry | 248/125.1 |
| 1,666,293 A | * | 4/1928 | Lorton | 211/86.01 |
| 3,045,660 A | * | 7/1962 | Manley et al. | 126/30 |
| 3,076,557 A | * | 2/1963 | Husted et al. | 211/196 |
| 3,333,807 A | * | 8/1967 | Locatelti | 248/226 |
| 3,828,373 A | * | 8/1974 | Fraley | 4/646 |
| 3,995,796 A | * | 12/1976 | Kline | 248/121 |
| 4,096,951 A | * | 6/1978 | Menssen | 211/207 |
| 4,625,937 A | * | 12/1986 | Haase | 248/545 |
| 4,741,486 A | * | 5/1988 | Ancona et al. | 242/597.4 |
| 4,807,837 A | * | 2/1989 | Gawlik et al. | 248/125.8 |
| 5,108,058 A | * | 4/1992 | White | 248/126 |
| 5,269,599 A | | 12/1993 | Moring | |
| 5,323,991 A | * | 6/1994 | West | 248/121 |
| 6,029,646 A | | 2/2000 | Jackson | |
| D435,685 S | | 12/2000 | Lelm | |

* cited by examiner

Primary Examiner—Leslie A. Braun
Assistant Examiner—A. Joseph Wujciak, III
(74) Attorney, Agent, or Firm—Mallinckrodt & Mallinckrodt; Robert R. Mallinckrodt (57) ABSTRACT

A device for holding camping items ready for use at a camp site includes a support pole that is driven into the ground or is attached to a horizontal surface such as the top of a picnic table. The support pole has at least one, a preferably a plurality of, support arms that extend therefrom to hold camping items such as a lantern, paper towels, and cooking utensils. Support structures can also be secured to the support pole, such as by a sleeve which fits around the support pole to hold condiments, such as salt and pepper, or other items, such as garbage bags or a cutting board. The support arms are pivotally attached to the support pole to pivot between a support position wherein the arms extend from the support pole when the device is in use to hold the camping items, or a storage position wherein the arms are aligned with and substantially against the support pole for storage of the device.

23 Claims, 5 Drawing Sheets

DEVICE FOR HOLDING CAMPING ITEMS

RELATED APPLICATION

This application claims the benefit of Provisional Application Serial No. 60/290,223, filed May 11, 2001, and entitled Kamp Kadi Lantern Holder Plus.

BACKGROUND OF THE INVENTION

1. Field

The invention is in the field of camping equipment, and particularly equipment that organizes and holds other camping equipment for easy access and use.

2. State of the Art

There are various types of containers for carrying and organizing camping gear. These containers open to provide access to the gear carried. U.S. Pat. No. 5,269,599, for example, discloses a camper's chuck cabinet which holds camping kitchen items and opens to provide access to the items carried and provides a paper towel dispenser and utensil hooks on the lid of the container.

U.S. Pat. No. 6,029,646 shows an adjustable outdoor cooking rack comprising a vertical pole with cooking platforms extending therefrom. The pole is inserted into the ground adjacent a campfire and the cooking platforms rotated to desired positions over the fire. A hook is provided to hang a coffee pot over the fire. There is no provision for holding items other than pots and pans.

U.S. Pat. No. D435,685 shows an adjustable lantern holder comprising a pole inserted into the ground with an arm extending from the top with a hook for holding a lantern.

There remains a need for a rack that can be easily set up and used for holding a number of camping items during camping, and particularly cooking and related items, to make such items easily available, and that disassembles and folds into a package that is easy to store and transport.

SUMMARY OF THE INVENTION

According to the invention, a device for holding camping items ready for use at a campsite includes a support pole having at least one support arm pivotally attached thereto for movement between an extended support position wherein the support arm extends from the support pole to support camping items thereon and a storage position wherein the support arm is pivoted to be substantially aligned with and against the support pole for storage of the device. The support pole is held in substantially vertical position during use by either a clamp which clamps it in position to a substantially horizontal surface such as the top or bench of a picnic table, or by driving the lower end of the support pole into the ground.

In a preferred embodiment, a plurality of support arms are provided for holding a plurality of camping items. For example, one arm may support a lantern, other arms support cooking utensils or other items, and one arm may be configured to support a roll of paper towels. A weight arm may be provided to rest on the paper towel roll to keep towels from blowing away and to offer resistance to rolling of the roll to help in tearing towels off the roll.

Various item supporting structures in addition to the item support arms may be mounted on the support pole for supporting items such as garbage bags, condiments, and a cutting board. Such support structures may include a mounting sleeve to fit around the support pole so the structure can be secured to the pole in desired positions. The sleeve can slidably fit around the support pole so the structure can be slid along the pole to desired position and then secured to the pole, such as by a thumb screw in the sleeve, in the desired position.

The support pole is preferably provided in sections that fit together so the pole can be disassembled into its sections for easy storage. Assembly of the sections allows for easy placement of the sleeves of desired supporting structures around the pole as the sections are assembled and allows interchangeable sections, such as interchangeable bottom sections, to be selected for assembly. With interchangeable bottom sections, the user can choose between a section that is driven into the ground for holding the pole in substantially vertical position or a section that is secured to a substantially horizontal surface, such as the top of a picnic table, for holding the pole in substantially vertical position, as conditions dictate. Further, depending upon the bottom section chosen, more or fewer intermediate sections can be used to place the top section, the one usually having the support arms, at desired height off the ground for convenient use.

DRAWINGS

In the accompanying drawings which illustrate the best mode currently contemplated for carrying out the invention.

DETAILED DESCRIPTION OF THE ILLUSTRATED EMBODIMENT

Figure 1:
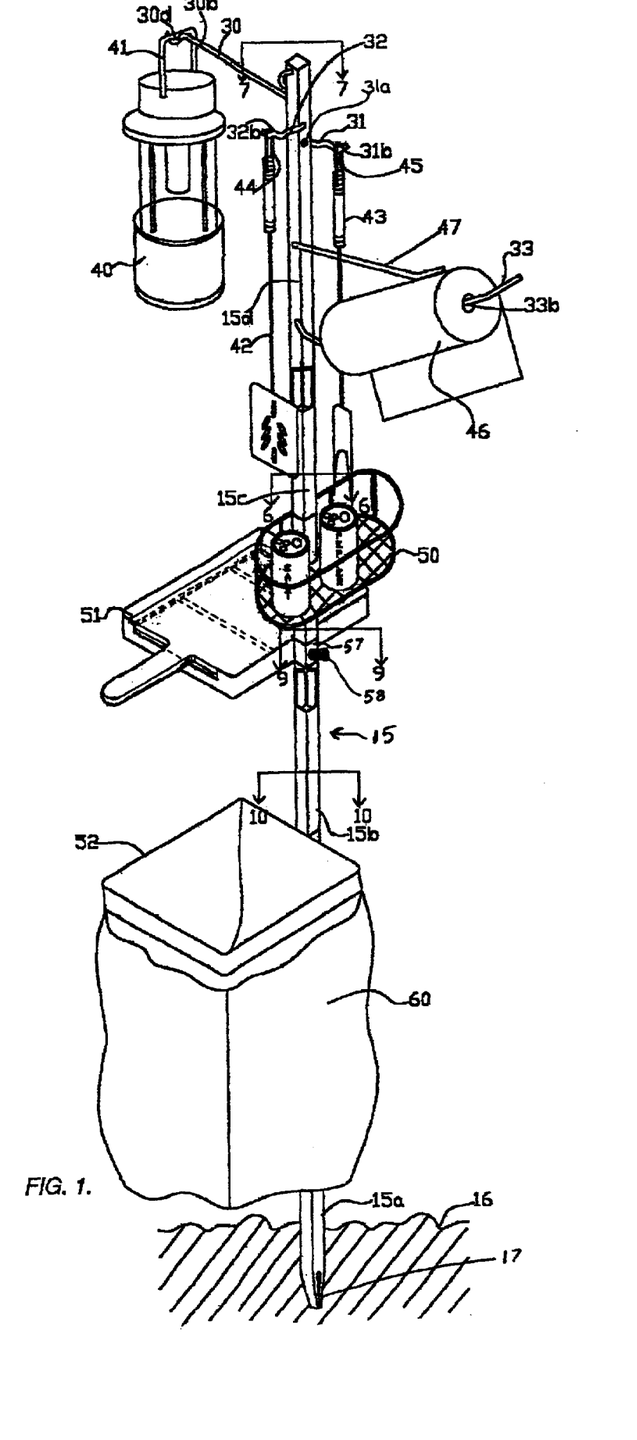
FIG. 1, is a perspective view of a device of the invention for holding camping items showing the device driven into the ground to hold it in substantially vertical orientation and showing the supporting arms pivoted to support positions.
Figure 2:
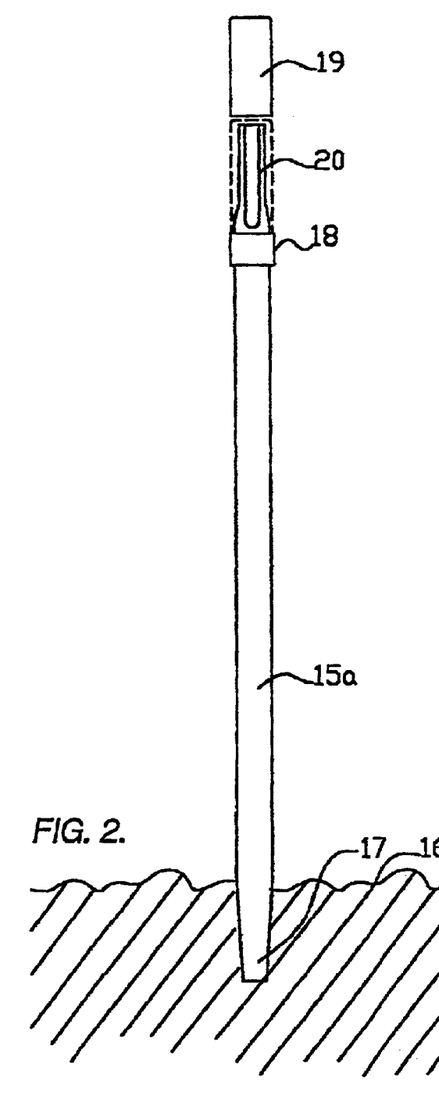
FIG. 2, a side elevation of the bottom section of the supporting pole of the device of FIG. 1, showing it driven into the ground and a driving sleeve useable to drive the section into the ground.

The device of the invention includes a support pole, indicated generally as 15 in FIG. 1, made up of interconnected pole sections 15*a*, 15*b*, 15*c*, and 15*d*. Lower or bottom pole section 15*a*, FIGS. 1 and 2, is driven into the ground 16 to support and hold the support pole 15 in a substantially vertical position. Lower pole section 15a has a wedge shaped bottom end 17 to facilitate insertion into the ground. Preferably a collar 18 is secured to the top portion of the pole section spaced from the top of the pole section and is positioned and adapted to receive the end of driving sleeve 19 there against when sleeve 19 is placed over the upper or top end portion 20 of the pole section 15a, as shown in broken lines in FIG. 2. The sleeve does not contact the top of the pole section. With this arrangement, when placed over the top of the pole section as shown in broken lines, the top of the sleeve can be hit with a hammer or other driving implement to drive the pole section into the ground. The driving force is transmitted to collar 18 and pole section 15a without impact to the top of the pole section which could deform the top of the pole section making it difficult to interconnect it to the remaining pole sections. As illustrated, the top end portion 20 of pole section 15a is of reduced size so as to fit into in telescoping manner the bottom end of intermediate pole section 15b.

Rather than driving the bottom section of the support pole 15 into the ground, the pole may be held in substantially vertical orientation by securing it to a substantially horizontal surface such as a picnic table top or bench. For this purpose, an alternate and interchangeable bottom pole section 21, FIG. 5, maybe provided. Pole section 21 has a screw clamp 22 with screw 23 at the bottom end thereof. The screw clamp may be placed around any substantially horizontal surface 24 to secure the pole section 21 and support pole 15 in substantially vertical orientation. It has been found that when the device of the invention is used to hold cooking and related camping items, it is generally convenient to clamp pole section 21 to the top of a picnic table. The top end 25 of pole section 21 is of reduced size similar to the top end 20 of pole section 15a so that it will fit into the bottom open end of another pole section such as intermediate pole section 15b, as shown.

Figure 3:
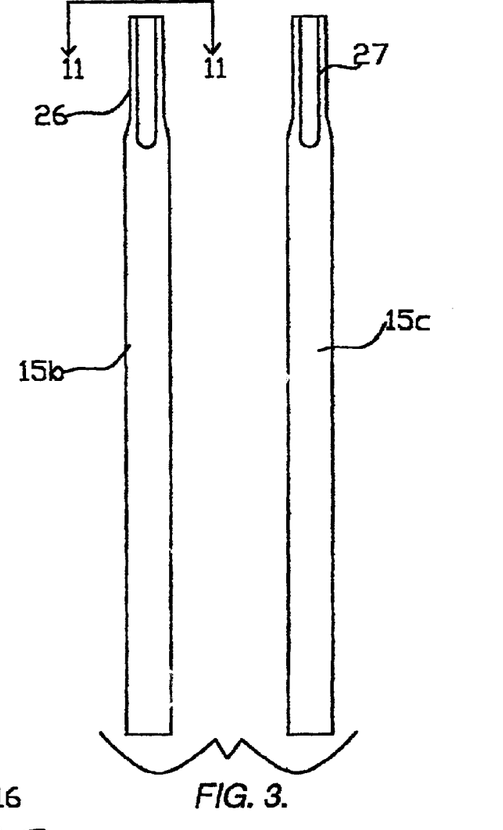
FIG. 3, a side elevation of two intermediate sections of the supporting pole.
Figures 4, 5:
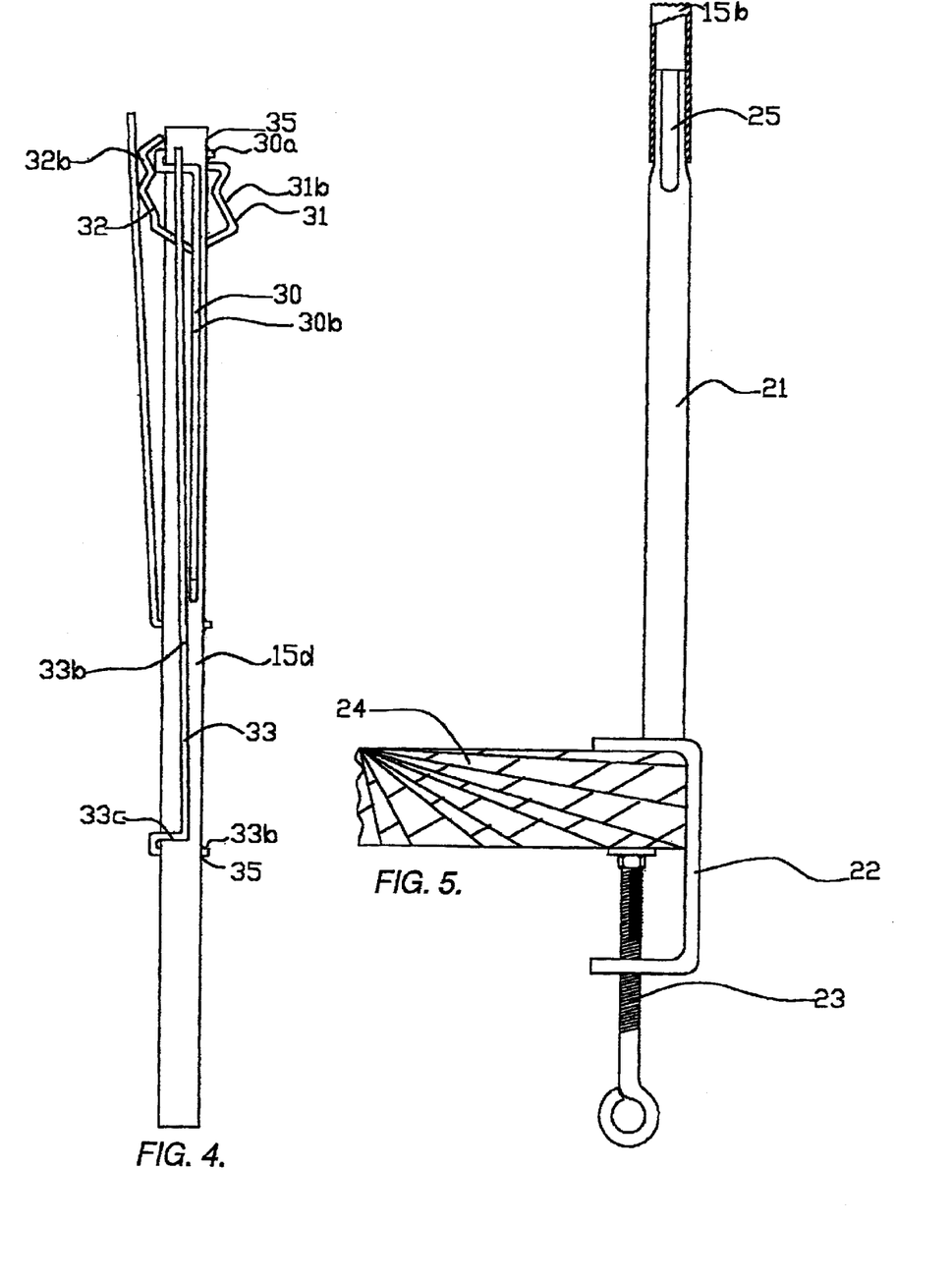
FIG. 4, a side elevation of the top section of the supporting pole with the supporting arms pivoted to their storage positions.
FIG. 5, a side elevation of an alternate bottom section of the support pole having a clamp on the bottom end thereof for clamping attachment to a substantially horizontal surface.
Figure 11:
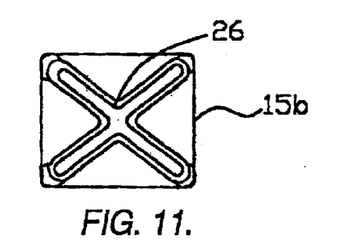
FIG. 11, a top plan view of the end of one of the poles taken on the line 11—11 of FIG. 3.

Intermediate pole sections 15b and 15c are shown in FIG. 3, each with reduced size top end portions 26 and 27, respectively. All of the pole sections may be conveniently made of lengths of square tubing. The reduced size end portions may be formed by collapsing the sides of the tubing inwardly in the configuration as shown in FIGS. 3 and 11. This allows the reduced size end portion of each pole section to be inserted into and be received in the opposite and open end portion of the tubing, as shown in FIG. 5. Other pole section coupling means could be used such as inserts or outserts (coupling sleeves) attached to one end of adjacent pole sections to be received by or to receive the adjacent pole section. Further, other shaped pole sections such as cylindrical pole sections could be used. With cylindrical pole sections, the size of one end of each section could be reduced by swedging of the pole end.

The support pole 15 is assembled but securing a bottom pole section in substantially vertical orientation such as by driving bottom pole section 15a, FIG. 2, into the ground, or by securing alternate bottom pole section 21 to the top of a picnic table or other substantially horizontal surface. An intermediate pole section 15b is then secured to the bottom pole section. A second intermediate pole section 15c, FIG. 1, may then be secured to the first intermediate pole section, if desired, and the top pole section 15d secured to it. It has been found convenient for packing and storage purposes to make pole sections about eighteen inches each, although any length could be used. With eighteen inch pole sections, generally two intermediate pole sections 15b and 15c will be used with bottom section 15a driven into the ground, and only one intermediate pole section 15b will be used with bottom pole section 21 when secured to a picnic table top.

The top support pole section 15d, FIGS. 1 and 4, includes at least one supporting arm pivotally attached thereto, with four supporting alms 30, 31, 32, and 33 being shown. The supporting arms all are pivotally attached to the supporting pole and pivot between supporting positions in which the supporting arms extend outwardly from the supporting pole as shown in FIG. 1, and storage positions wherein the supporting arms are pivoted to be substantially aligned with and against the supporting pole as shown in FIG. 4. This allows for easy storage of the pole sections when not in use because the support arms do not extend from this top pole section with the arms in the storage position.

Figures 6, 7, 8:
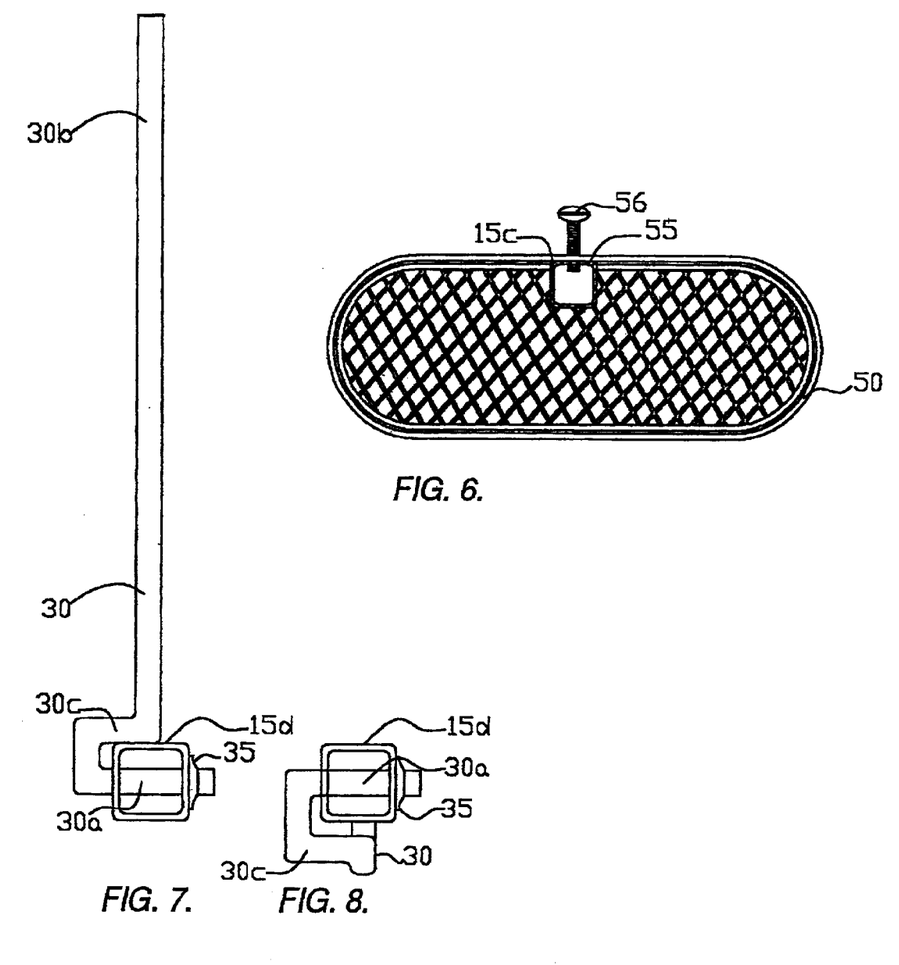
FIG. 6, a transverse section taken on the line 6—6 of FIG. 1 showing the condiment support structure in top plan view.
FIG. 7, a top plan view taken on the line 7—7 of FIG. 1 showing only the top support arm which is in support position.
FIG. 8, a top plan view similar to that of FIG. 7, showing the top support arm pivoted to its storage position.
Figure 9:
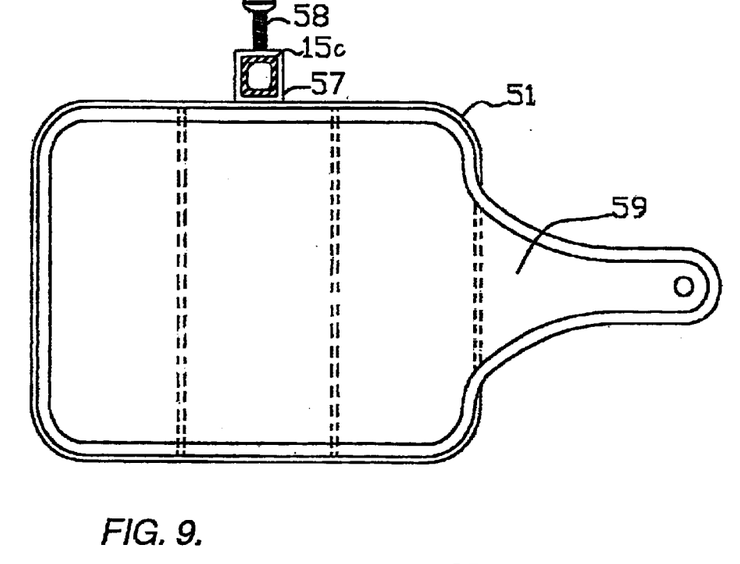
FIG. 9, a transverse section taken on the line 9—9 of FIG. 1, showing the cutting board supporting structure in top plan view.

The support arms may be pivotally secured to the support pole in various ways. It has been found satisfactory to configure the support arms to each have a mounting section shown as 30a for support arm 30 in FIGS. 4, 7, and 8, and as 33a for support arm 33 in FIG. 4. The mounting section of each support arm extends substantially perpendicularly to supporting sections 30b, 31b, 32b, and 33b of the arms. The mounting sections of each support arm are received by and extend through receiving holes in the pole section 15d to pivotally mount the arms to the pole section. Clips 35 are secured to the ends of the mounting portions extending from the supporting pole to prevent the arms from coming out of the receiving holes, thereby securing the arms to the pole. Each arm preferably also includes a stop portion, for example 33c for arm 33 in FIG. 4 and 30c for arm 30 in FIGS. 7 and 8. The arms are configured so that the stop portions are substantially parallel with the mounting portions, but spaced therefrom and abut the support pole when the arms are pivoted to support position to hold the arms in the extended support position. FIG. 8 shows support arm 30 in folded position as also shown in FIG. 4. As shown in FIG. 7, as arm 30 is pivoted about its mounting portion 30b secured in pole section 15d to the support position shown in FIGS. 7 and 1, stop section 30c abuts a side of support pole 15d to stop any further rotation or pivoting of the arm. Gravity will tend to continue to rotate the support arm downwardly, but further rotation is stopped by stop portion 30c. All support arms will be configured with stop portions, or will have other means of stopping rotation of the arms, so that each support arm will be held in its support position when rotated to support position.

In the particular embodiment illustrated in FIG. 1, support arm 30 can support a variety of items with a lantern 40 being shown. The lantern bale 41 is received by an indentation 30d in support portion 30b of support arm 30 so that the bale does not slide along support arm 30. Support arms 31 and 32 have similar indentations 31d and 32d for receiving items to be held. FIG. 1 shows cooking utensils 42 and 43 hung by hanger loops 44 and 45 on support arms 31 and 32, respectively. Arm 33 supports a roll of paper towels 46. A weight arm 47 is pivotally mounted to support pole section 15d similarly to the support arms, but does not have a stop portion associated therewith so is free to fall by gravity against the roll of paper towels as shown in FIG. 1 to keep the towels from being blown off the roll in windy conditions and to provide some resistance to free rotation of the roll of towels so the towels can be easily torn from the roll in normal manner.

Additional item supporting structures may be provided for the device as desired. FIG. 1 shows a condiment supporting structure 50, a cutting board supporting structure 51, and a garbage bag supporting structure 52. Each supporting structure includes a mounting sleeve which fits around the support pole. FIG. 6 shows the condiment holder or support structure 50 with intermediate pole section 15c extending through mounting sleeve 55. The condiment supporting structure is shown with a supporting surface and a railing spaced above the supporting surface by spacer links to hold items on the supporting surface. FIG. 1 shows salt and pepper shakers in the condiment holder 50. Sleeve 55 of condiment supporting structure 50 is slid over pole section 15c before securement of top pole section 15d and supporting structure 50 will slide up or down along intermediate pole sections 15b and 15c to any desired position. A thumb screw 56 is threaded through the mounting sleeve 55 and is tightened against pole section 15c to secure the supporting structure in desired position. Similarly, sleeve 57 attached to cutting board supporting structure 51 is placed over support pole section 15c and is secured in desired position along the pole section by thumb screw 58. A cutting board 59 can be placed in and supported by supporting cross members extending between the perimeter of supporting structure 51.

Figure 10:
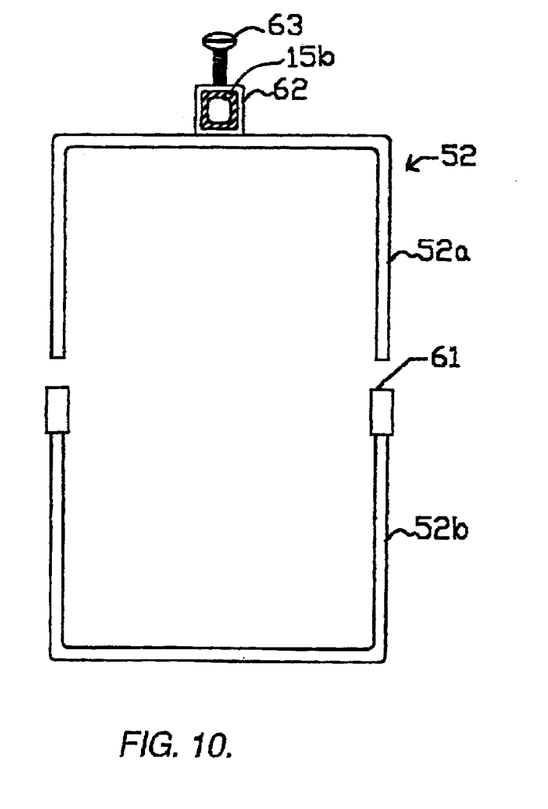
FIG. 10, a transverse section taken on the line 10—10 of FIG. 1 showing the garbage bag supporting structure in top plan view.

A garbage bag holder 52 forms a loop to mount and hold a plastic garbage bag 60, FIG. 1. The loop may be formed as a single piece loop, or, as shown in FIG. 10, may be formed of two halves 52a and 52b which are removably connected by sleeves 61. The two piece construction allows disassembly for better storage. A sleeve 62 is slid over pole section 15b and is secured in desired position along the pole section by thumb screw 63.

It should be realized that supporting structures of various configurations adapted to hold various types of items can be used with the device and mounted similarly to the support pole as those specific structures shown. Other pivotal mountings can be used such as a mounting sleeve attached to the outside of the pole through which the mounting section of an arm passes. In addition, various configurations of supporting arms can be used and be adapted to supporting various items. Such arms may be pivotally attached to intermediate pole sections as well as to just the top section as shown. Further, the supporting pole can be made in interconnecting sections as show with the sections being of any desired length or can be made as a single length of pole.

Whereas the invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A device for holding camping items ready for use at a camp site, comprising:
    a support pole having a longitudinal axis;
    at least one support arm having a mounting section at one end thereof, a support section extending substantially perpendicularly to the mounting section for holding a camping item thereon, and a stop section between the mounting section and the support section substantially parallel to the mounting section and spaced therefrom, said mounting section extending through the support pole to pivotally attach the at least one support arm to the support pole with the support arm pivotable between a support position extending from the support pole for holding the camping item wherein the stop section abuts the support pole to maintain the support arm in the support position during use of the device and a storage position substantially aligned with and against the support pole for storage of the device; and
    means for holding the support pole in substantially vertical position during use of the device;
    wherein the at least one support arm is adapted to hold a supporting loop extending from a cooking utensil.

2. A device for holding camping items ready for use at a camp site, comprising:
    a support pole having a longitudinal axis;
    at least one support arm having a mounting section at one end thereof, a support section extending substantially perpendicularly to the mounting section for holding a camping item thereon, and a stop section between the mounting section and the support section substantially parallel to the mounting section and spaced therefrom, said mounting section extending through the support pole to pivotally attach the at least one support arm to the support pole with the support arm pivotable between a support position extending from the support pole for holding the camping item wherein the stop section abuts the support pole to maintain the support arm in the support position during use of the device and a storage position substantially aligned with and against the support pole for storage of the device; and
    means for holding the support pole in substantially vertical position during use of the device;
    wherein the support pole is square in cross section having four sides, and four support arms are pivotally attached to the support pole with one of the four support antis extending outwardly from each side of the four sides of the support pole.

3. A device for holding camping items ready for use according to claim 2, additionally including an item support structure having a sleeve configured to fit around the support pole and be secured thereto.

4. A device for holding camping items ready for use according to claim 3, wherein the sleeve is slidable along the support pole to selected positions, and includes means for securing the sleeve to the support pole at the selected position.

5. A device for holding camping items ready for use according to claim 4, wherein the means for securing the sleeve to the support pole at the selected position is a thumb screw threaded through the sleeve to be tightened against the support pole.

6. A device for holding camping items ready for use according to claim 5, wherein the means for holding the support pole in substantially vertical position is a clamp for attachment to a substantially horizontal surface.

7. A device for holding camping items ready for use according to claim 6, wherein the substantially horizontal surface is a part of a picnic table.

8. A device for holding camping items ready for use according to claim 5, wherein the means for holding the support pole in substantially vertical position is an end of the support pole adapted to be driven into the ground.

9. A device for holding camping items ready for use according to claim 8, wherein the support pole is made up of sections, wherein a section is provided having opposite ends with one end thereof adapted to be driven into the ground, and with a collar spaced from the opposite end and adapted to receive a driving sleeve placed over the opposite end thereagainst for transmitting driving force from the driving sleeve to the pole section for driving the pole section into the ground.

10. A device for holding camping items ready for use at a camp site, comprising:
- a support pole having a longitudinal axis;
- at least one support arm having a mounting section at one end thereof which extends through the support pole to pivotally attach the at least one support arm to the support pole, said at least one support arm pivotable between a support position extending from the support pole for holding a camping item and a storage position substantially aligned with and against the support pole for storage of the device;
- means for holding the support pole in substantially vertical position during use of the device;
- an item support structure having a sleeve configured to fit around the support pole and slidable along the support pole to selected positions; and
- means for securing the sleeve to the support pole at the selected position;
- wherein the item support structure is adapted to hold a garbage bag and includes an open loop sized to receive an open top of a garbage bag therethrough, a portion of the open loop extending from the sleeve with a second portion of the open loop removably secured to the portion thereof extending from the sleeve by respective loop connecting sleeves.

11. A device for holding camping items ready for use according to claim 10, wherein the open loop is rectangular.

12. A device for holding camping items ready for use at a camp site, comprising:
- a support pole having a longitudinal axis;
- at least one support arm pivotally attached to the support pole and pivotable between a support position extending from the support pole for holding a camping item and a storage position substantially aligned with and against the support pole for storage of the device;
- an item support structure having a support sleeve configured to slidably fit around the support pole and slidable along the support pole to a selected position, said item support structure adapted to hold a garbage bag and additionally including an open loop sized to receive an open top of a garbage bag therethrough, a portion of the open loop extending from the sleeve with a second portion of the open loop removably secured to the portion thereof extending from the sleeve by respective loop connecting sleeves;
- means for securing the support sleeve to the support pole at the selected position; and
- means for holding the support pole in substantially vertical position during use of the device.

13. A device for holding camping items ready for use at a camp site, comprising:
- a support pole having a longitudinal axis;
- four support arms each having a mounting section at one end thereof, a support section extending substantially perpendicularly to the mounting section for holding a camping item thereon, and a stop section between the mounting section and the support section substantially parallel to the mounting section and spaced therefrom, said mounting section extending through the support pole to pivotally attach the support arm to the support pole with the support arm pivotable between a support position extending from the support pole for holding the camping item wherein the stop section abuts the support pole to maintain the support arm in the support position during use of the device and a storage position substantially aligned with and against the support pole for storage of the device, the four arms being oriented around the pole to extend from the pole when in support position at approximately ninety degrees to one another; and
- means for holding the support pole in substantially vertical position during use of the device.

14. A device for holding camping items ready for use according to claim 13, additionally including an item support structure having a sleeve configured to fit around the support pole and be secured thereto.

15. A device for holding camping items ready for use according to claim 14, wherein the sleeve is slidable along the support pole to selected positions, and includes means for securing the sleeve to the support pole at the selected position.

16. A device for holding camping items ready for use according to claim 15, wherein the means for securing the sleeve to the support pole at the selected position is a thumb screw threaded through the sleeve to be tightened against the support pole.

17. A device for holding camping items ready for use according to claim 13, wherein the means for holding the support pole in substantially vertical position is a clamp for attachment to a substantially horizontal surface.

18. A device for holding camping items ready for use according to claim 17, wherein the substantially horizontal surface is a part of a picnic table.

19. A device for holding camping items ready for use according to claim 13, wherein the means for holding the support pole in substantially vertical position is an end of the support pole adapted to be driven into the ground.

20. A device for holding camping items ready for use according to claim 19, wherein the support pole is made up of sections, wherein a section is provided having opposite ends with one end thereof adapted to be driven into the ground, and with a collar spaced from the opposite end and adapted to receive a driving sleeve placed over the opposite end thereagainst for transmitting driving force from the driving sleeve to the pole section for driving the pole section into the ground.

21. A device for holding camping items ready for use at a camp site, comprising:
- a support pole having a longitudinal axis;
- at least one support arm pivotally attached to the support pole and pivotable between a support position extending from the support pole for holding a camping item and a storage position substantially aligned with and against the support pole for storage of the device;
- an item support structure configured to be secured to and extend from the support pole and adapted to hold a garbage bag, said item support structure including an open loop sized to receive an open top of a garbage bag therethrough;
- means for securing the item support structure to the support pole; and
- means for holding the support pole in substantially vertical position during use of the device.

22. A device for holding camping items ready for use at a camp site according to claim 21, wherein the open loop includes two portions removably secured together by respective loop connecting sleeves.

23. A device for holding camping items ready for use according to claim 22, wherein the open loop is rectangular.

* * * * *

(12) EX PARTE REEXAMINATION CERTIFICATE (7437th)
United States Patent
Johnson (10) Number: US 6,736,358 C1
(45) Certificate Issued: Mar. 30, 2010

(54) DEVICE FOR HOLDING CAMPING ITEMS

(75) Inventor: Freddie E. Johnson, Salt Lake City, UT (US)

(73) Assignee: Royal Quest LLC, Grand Prairie, TX (US)

Reexamination Request:
No. 90/008,906, Oct. 26, 2007

Reexamination Certificate for:
Patent No.: 6,736,358
Issued: May 18, 2004
Appl. No.: 10/142,319
Filed: May 9, 2002

Related U.S. Application Data (60) Provisional application No. 60/290,223, filed on May 11, 2001.

(51) Int. Cl.
*A47F 5/00* (2006.01)
*A45F 3/00* (2006.01)
*A45F 3/44* (2006.01)
*F16M 11/00* (2006.01)

(52) U.S. Cl. .................................... 248/125.3
(58) Field of Classification Search .......... None
See application file for complete search history.

(56) References Cited

U.S. PATENT DOCUMENTS

| | | | | |
|---|---|---|---|---|
| 3,333,807 A | * | 8/1967 | Locatelli | 248/231.71 |
| 3,749,253 A | * | 7/1973 | Carter | 211/171 |
| 4,096,951 A | * | 6/1978 | Menssen | 211/207 |
| 4,856,740 A | * | 8/1989 | MacLeod et al. | 248/97 |
| 4,896,651 A | * | 1/1990 | Kott, Jr. | 126/30 |
| 4,940,201 A | * | 7/1990 | Kurth | 248/101 |

* cited by examiner

*Primary Examiner*—Catherine S. Williams (57) ABSTRACT

A device for holding camping items ready for use at a camp site includes a support pole that is driven into the ground or is attached to a horizontal surface such as the top of a picnic table. The support pole has at least one, a preferably a plurality of, support arms that extend therefrom to hold camping items such as a lantern, paper towels, and cooking utensils. Support structures can also be secured to the support pole, such as by a sleeve which fits around the support pole to hold condiments, such as salt and pepper, or other items, such as garbage bags or a cutting board. The support arms are pivotally attached to the support pole to pivot between a support position wherein the arms extend from the support pole when the device is in use to hold the camping items, or a storage position wherein the arms are aligned with and substantially against the support pole for storage of the device.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–9 and 13–21 are cancelled.

Claims 10–12 and 22–23 are determined to be patentable as amended.

10. A device for holding camping items ready for use at a camp site, comprising:
 a support pole having a longitudinal axis; at least one support arm having a mounting section at one end thereof which extends through the support pole to pivotally attach the at least one support arm to the support pole, said at least one support arm pivotable between a support position extending from the support pole for holding a camping item and a storage position substantially aligned with and against the support pole for storage of the device;
 means for holding the support pole in substantially vertical position during use of the device;
 an item support structure having a sleeve configured to fit around the support pole and slidable along the support pole to selected positions; and
 means for securing the sleeve to the support pole at the selected position;
 wherein the item support structure is adapted to hold a garbage bag and includes [an open] *a* loop sized to receive an open top of a garbage bag therethrough, a *first* portion of the [open] loop extending from the sleeve with a second portion of the [open] loop removably secured to the *first* portion thereof [extending from the sleeve by respective] *by* loop connecting sleeves, *the first and second portions of the loop together forming the loop*.

11. A device for holding camping items ready for use according to claim 10, wherein the [open] loop is rectangular.

12. A device for holding camping items ready for use at a camp site, comprising:
 a support pole having a longitudinal axis;
 at least one support arm pivotally attached to the support pole and pivotable between a support position extending from the support pole for holding a camping item and a storage position substantially aligned with and against the support pole for storage of the device;
 an item support structure having a support sleeve configured to slidably fit around the support pole and slidable along the support pole to a selected position, said item support structure adapted to hold a garbage bag and additionally including [an open] *a* loop sized to receive an open top of a garbage bag therethrough, a *first* portion of the [open] loop extending from the sleeve with a second portion of the [open] loop removably secured to the *first* portion thereof [extending from the sleeve by respective] *by* loop connecting sleeves, *the first and second portions of the loop together forming the loop*;
 means for securing the support sleeve to the support pole at the selected position; and
 means for holding the support pole in subtantially vertical position during use of the device.

22. A device for holding camping items ready for use at a camp site[according to claim 21], *comprising:*
 *a support pole having a longitudinal axis;*
 *at least one support arm pivotally attached to the support pole and pivotable between a support position extending from the support pole for holding a camping item and a storage position substantially aligned with and against the support pole for storage of the device;*
 *an item support structure configured to be secured to and extend from the support pole and adapted to hold a garbage bag, said item support structure including a continuous loop sized to receive an open top of a garbage bag therethrough;*
 *means for securing the item support structure to the support pole;*
 *means for holding the support pole in substantially vertical position during use of the device; and*
 wherein the [open] loop includes two portions removably secured together by respective loop connecting sleeves *to form the continuous loop*.

23. A device for holding camping items ready for use according to claim 22, wherein the [open] loop is rectangular.

* * * * *